United States Patent [19]

Koishi et al.

[11] Patent Number: 4,688,203

[45] Date of Patent: Aug. 18, 1987

[54] OPTICAL RECORDING AND REPRODUCING APPARATUS

[75] Inventors: Kenji Koishi, Hyogo; Tamotsu Matsuo, Osaka; Isao Satoh, Neyagawa, all of Japan

[73] Assignee: Matsushita Electric Industrial Co., Ltd., Osaka, Japan

[21] Appl. No.: 691,523

[22] PCT Filed: Apr. 23, 1984

[86] PCT No.: PCT/JP84/00211

§ 371 Date: Dec. 21, 1984

§ 102(e) Date: Dec. 21, 1984

[87] PCT Pub. No.: WO84/04417

PCT Pub. Date: Nov. 8, 1984

[30] Foreign Application Priority Data

Apr. 22, 1983 [JP] Japan ................................. 58-71670

[51] Int. Cl.⁴ .......................... G11B 7/00; G11B 20/10
[52] U.S. Cl. ...................................... 369/48; 369/124; 369/111; 369/116
[58] Field of Search ............... 369/124, 111, 106, 116, 369/109, 275, 277, 278, 47, 48; 360/27, 132

[56] References Cited

U.S. PATENT DOCUMENTS

| | | | |
|---|---|---|---|
| 4,243,850 | 1/1981 | Edwards | 369/109 |
| 4,338,644 | 7/1982 | Staar | 360/137 |
| 4,472,748 | 9/1984 | Kato | 369/111 |
| 4,556,967 | 12/1985 | Braat | 369/48 |

FOREIGN PATENT DOCUMENTS 5528610 8/1978 Japan.
5625262 8/1979 Japan.
56-145530 4/1980 Japan.
5994242 11/1982 Japan.

*Primary Examiner*—Alan Faber
*Attorney, Agent, or Firm*—Stevens, Davis, Miller & Mosher

[57] ABSTRACT

An optical recording and reproducing apparatus in which a laser beam is converged to a tiny beam spot and projected onto an optical disc to change thermally the optical disc, thereby effecting recording and reproducing of a signal and which detects a mark (17) for determining a recording polarity of the optical disc which is provided on an optical disc or a disc jacket and effects switching between analog gate switches (23a), (23b) in accordance with the result of the detection thereby to control a polarity of a signal to be recorded or reproduced in a positive or negative direction, whereby it is made possible to stably effect recording and reproduction of signals on optical discs which provide reproduced signals of different polarities because of the characteristics of their recording materials, such as erasable optical discs and unerasable optical discs, by using one and the same recording and reproducing apparatus.

4 Claims, 12 Drawing Figures

OPTICAL RECORDING AND REPRODUCING APPARATUS

TECHNICAL FIELD

The present invention relates to an optical recording and reproducing apparatus in which a laser beam is converged to a tiny beam spot and projected onto an optical disc to cause a thermal change therein thereby to effect signal recording and in which during a reproduction process, a beam spot having an intensity level lower than that of the beam for use in recording is projected onto the optical disc to reproduce the recorded signals.

BACKGROUND ART

Recent practice has been to converge a laser beam to a beam spot having a diameter of about 1 μm and thereby to record and reproduce signals on and from an optical disc, respectively. Particularly, there has come into use an apparatus in which a recording material is evaporated onto an optical disc and a thermal change is caused in the recording material by applying a laser beam thereonto to thereby attain recording.

An example of a conventional optical recording and reproducing apparatus of the above-mentioned type will now be described with reference to the drawings.

FIG. 1 shows the construction of a conventional optical recording and reproducing apparatus. The laser beam from a semiconductor laser 1 is concentrated by a condenser lens 2 and then projected onto a convergent lens 5 through a total reflection mirror 4. The convergent lens 5 converges the incident beam to a tiny beam spot of about 1 μm φ on an optical disc 8. The reflected beam from the optical disc 8 is passed again through the convergent lens 5 and the total reflection mirror 4 and sent to a beam splitter 3, from which it is received by a light detector 6. Numeral 7 designates a disc motor which rotates the optical disc 8. Numeral 9 designates a preamplifier for amplifying the output signal from the light detector 6 and applying it to a digital demodulator 11 through a signal processing circuit 10. Numeral 12 designates a semiconductor laser drive circuit which is responsive to the signal from a modulator 13 during a recording process to drive the semiconductor laser 1 by an electric current having a value sufficient enough to make its light output higher than the sensitivity of the recording material.

FIG. 2a shows the manner in which a signal is recorded along a guide track 14 in the form of a furrow or groove preliminarily formed on the optical disc 8 in the phase structure. FIG. 2b shows the waveform of an output signal of the preamplifier 9 generated by reproducing the thus recorded pits.

When the tiny beam spot is projected onto the recording material on the optical disc 8, the recording material is changed thermally and blackened as shown in FIG. 2a (the hatched portions). As shown by the output waveform of a reproduced signal in FIG. 2b, the blackened portions are increased in the reflectance (the reflectance increases in the upward direction (the positive direction) in the Figure). In other words, the signal is recorded at the portions of the recording material which are blackened to have an increased relectance. This recording is referred to as blackening recording. TeOx-type materials are used as suitable recording materials for the blackening recording. The TeOx-type materials allow recording therein, but erasing therefrom (restoration) is relatively difficult.

FIG. 3 explains recording materials suitable for the so-called whitening recording, and it shows the manner in which the pits are recorded along the guide track 14 like FIG. 2. In FIG. 3a, when the ting beam spot is projected onto the recording material on the disc, the material is changed thermally and whitened. As shown by the reproduced signal output waveform in FIG. 3b, the portions having the signal recorded therein and whitened are decreased in the reflectance (the reflectance also increases in the upward direction (the positive direction) in FIG. 3b as in the case of FIG. 2b). In other words, the signal is recorded in the portions which are whitened and decreased in the reflectance. This recording is referred to as whitening recording. Suitable materials for this system are TeGexOy-type materials which allow recording and erasing (restoration).

As described so far, the polarity of the reproduced output signal waveforms generated from the optical discs differs depending on the different recording materials. From the point of view of effectively utilizing optical discs, a recording and reproducing apparatus is not necessarily limited to its use of optical discs coated with one kind of recording material by the evaporation process. The optical disc of the blackening recording system incapable of erasing is suitable for the recording of information which should not be erased but should be retained permanently, and it is expected for the utilization as a data base. On the other hand, the optical disc of the whitening recording system capable of erasing is suitable for use as a working area of a memory in a computer.

Thus, there is a sufficient possibility for the same recording and reproducing apparatus to perform recording and reproducing on the optical discs employing two or more kinds of recording materials. The problem encountered in such a case is the fact that the polarity of a reproduced signal differs depending on the recording material as mentioned previously. The optical recording and reproducing apparatus constructed as shown in FIG. 1 is disadvantageous in that the apparatus cannot effect recording and reproducing on the optical discs employing recording materials which produce reproduced signals of different polarities.

DISCLOSURE OF THE INVENTION

In view of the foregoing deficiencies, it is an object of the present invention to provide an optical recording and reproducing apparatus which is capable of stably effecting recording and reproducing even on such optical discs which produce reproduced signals of different polarities because of the characteristics of the recording materials, and more particularly to provide an optical recording and reproducing apparatus which is capable of effecting recording and reproducing on both optical discs having an erasing function and those having no erasing function.

An optical recording and reproducing apparatus according to this invention is of the type in which a first light source such as a laser beam is converged to a tiny beam spot and a thermal change is caused by the application thereof on an optical disc, thereby effecting recording and reproducing of signals, and which is charaterized by comprising mark detecting means for detecting a mark provided on the optical disc or in a disc jacket containing the optical disc which is to be used to determine a recording polarity of the optical disc, and control means for controlling the polarity of a recorded or reproduced signal in a positive or negative direction depending on the mark detected by the mark detecting means.

BEST MODE FOR CARRYING OUT THE INVENTION

Embodiments of the present invention will be described hereunder with reference to the drawings.

Figure 4:
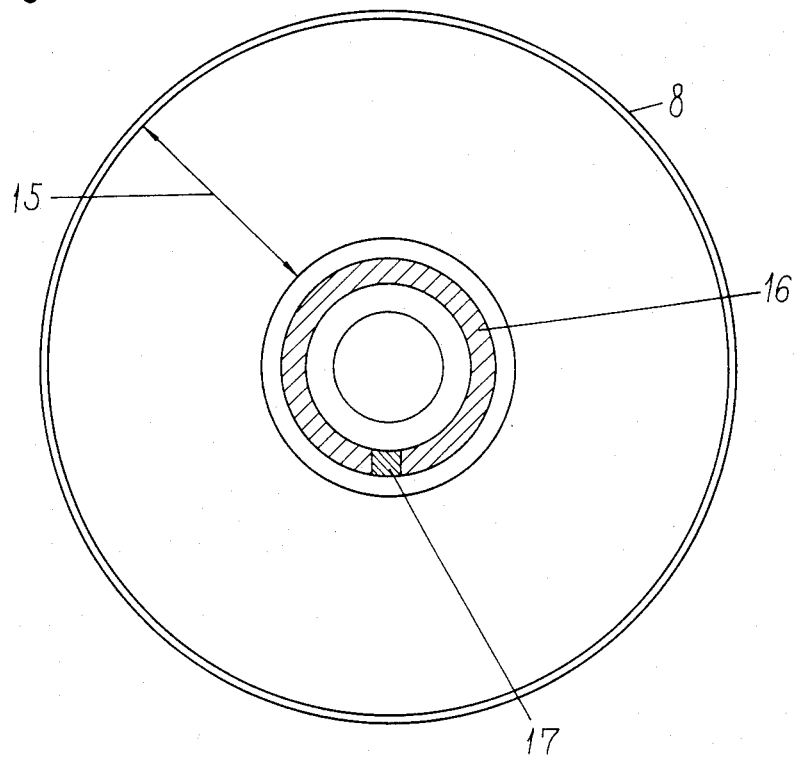
FIG. 4 is a plan view showing the construction of an optical disc in an optical recording and reproducing apparatus according to an embodiment of this invention.

FIG. 4 shows the construction of an optical disc in an optical recording and reproducing apparatus of an embodiment of this invention. In FIG. 4, numeral 8 designates the optical disc, and 15 an information recording area on which recording is effected by converging a laser beam to a tiny beam spot. These are formed in the information recording area 15 a guide track in the concentric form or in the spiral form. Numeral 16 designates an area which is provided in an inner circumferential portion of the information recording area and in which is formed a mask for determining a recording polarity of the optical disc. Numeral 17 designates a decision mark formed in the area 16. The construction of this decision mark section is shown in FIG. 5.

Figure 2:
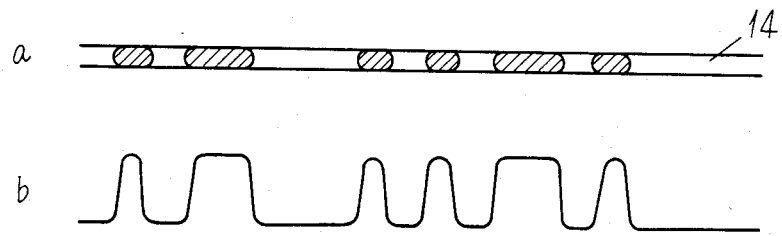
FIG. 2, consisting of a and b, shows the manner in which a signal is recorded on an optical disc of the blacking recording type and the waveform of the reproduced signal.
Figure 3:
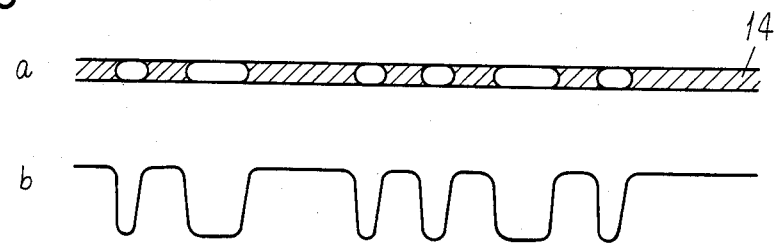
FIG. 3, consisting of a and b, shows the manner in which a signal is recorded on an optical disc of the whitening recording type and the waveform of the reproduced signal.
Figure 5:
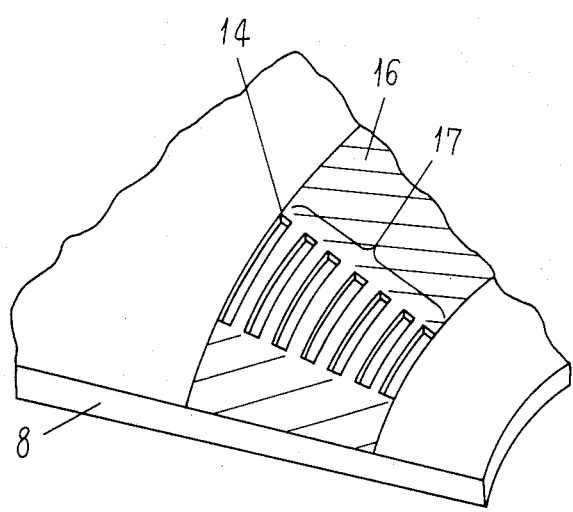
FIG. 5 is a perspective view showing an exemplary construction of a mark which is used to determine a recording polarity of the optical disc.

By providing, for example, the phase structure of groove pits similar to the guide track in the information recording area, in a portion of the circular arc of the mark area 16 as shown in FIG. 5, it is possible to detect the decision mark optically. Such phase structure can be formed in the like manner as the guide track in the information recording area 15 during the cutting of the optical disc master. Thus, it is possible to stabilize the quality of the decision mark and reduce the production cost. The decision mark can be easily detected by a simple reflection-type light detector, which combines a light emitting diode and a photodiode, separately from the tiny beam spot for recording and reproducing in the information recording area. When the light from the light emitting diode or the like is projected onto the decision mark section having the groove structure, the light is diffracted and its reflectance is decreased. This change in the reflectance can be detected sufficiently by the inexpensive photodiode. The decision mark is provided for example for a whitening recording material shown in FIG. 3, but the mark is not provided for a blackening recording material shown in FIG. 2. The control is effected so that the polarity of a preamplifier output signal is kept unchanged when the mark is not detected and the polarity of the preamplifier output signal is inverted when the mark is detected. By so doing, the polarity of an input signal applied to a signal processing circuit including a waveform equalizer or the like remains the same irrespective of the recording material of the disc. The format of the decision mark is not limited to the decision of the presence or absence of the mark as mentioned above, but various other formats may be used. The phase structure of the groove pits may be arranged in the circumferential direction in the decision mark area thereby to effect coding.

Also, there are cases where not only the polarity of reproduced signals but also the rate of the change in the reflectance of the recorded and unrecorded portions differs depending on the recording material. In such cases, the amplitude of the reproduced signals may be controlled in accordance with the detected mark to obtain the optimum reproduced signals.

Figure 1:
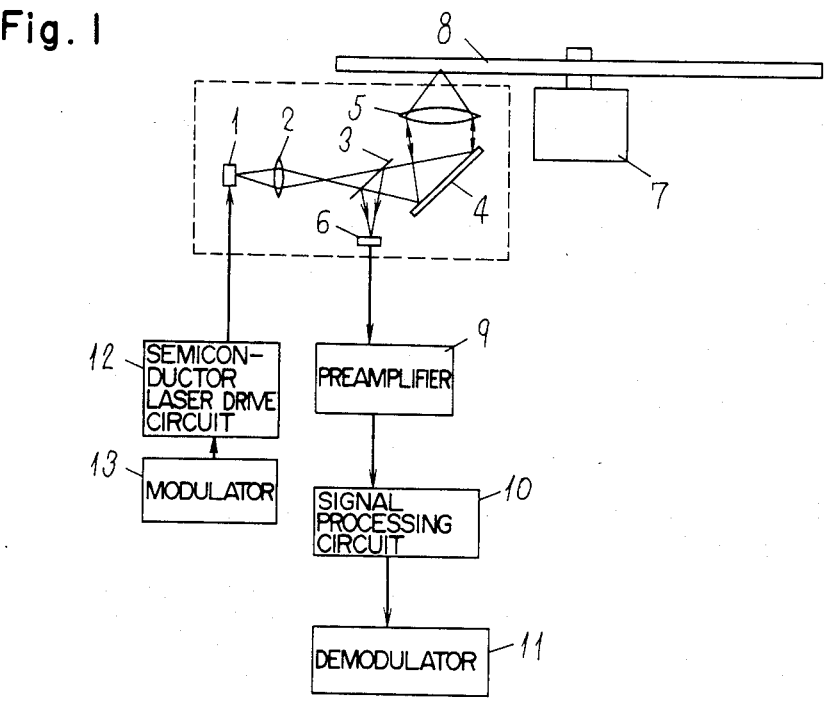
FIG. 1 is a block diagram showing the construction of a conventional optical recording and reproducing apparatus.
Figure 6:
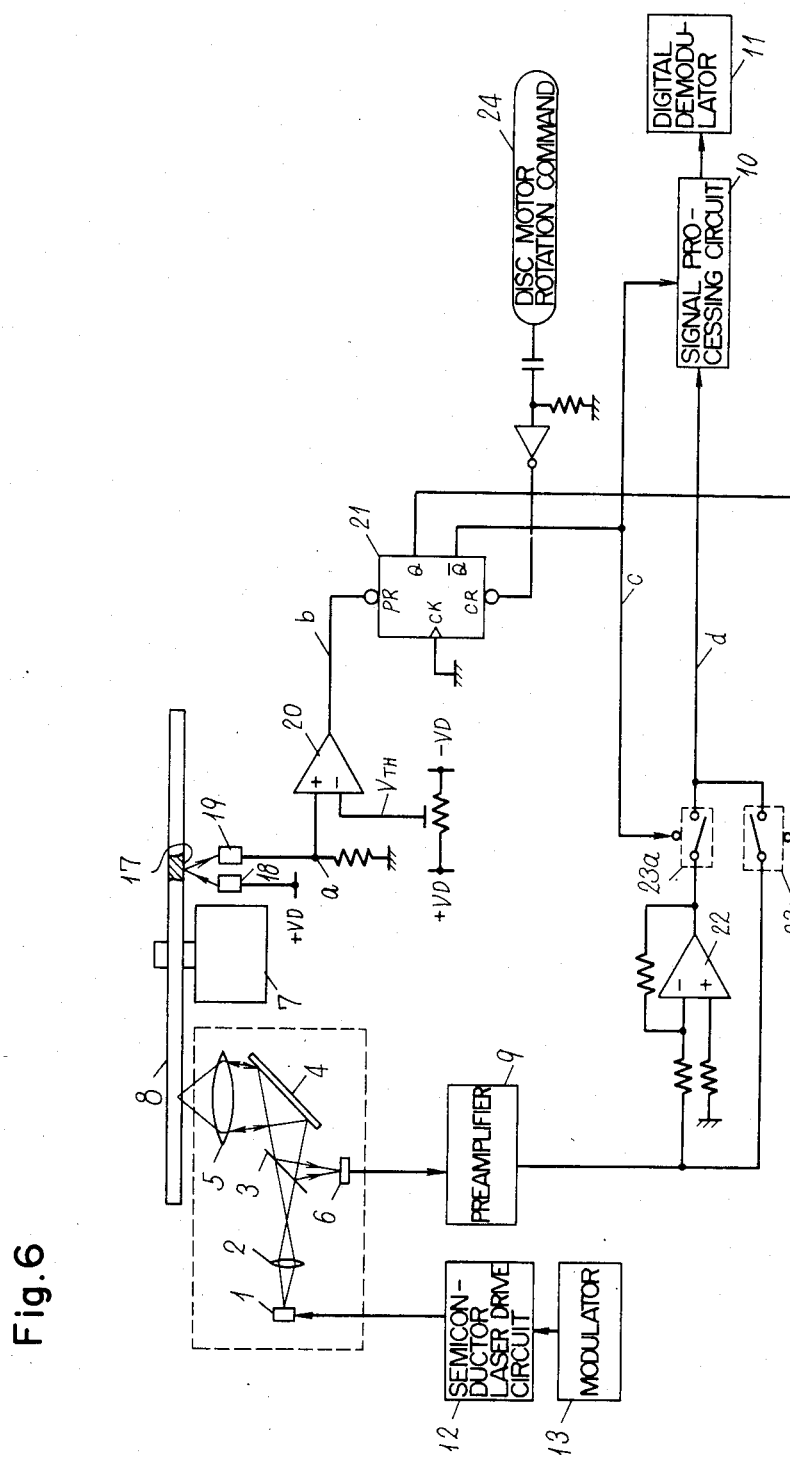
FIG. 6 is a block diagram showing the construction of the optical recording and reproducing apparatus of another embodiment of this invention.

FIG. 6 shows the construction of an optical recording and reproducing apparatus of another embodiment of this invention. In FIG. 6, the component elements designated by the same numerals as in FIG. 1 have the same construction as those shown in FIG. 1. In FIG. 6, numeral 18 designates a light emitting diode and 19 and photodiode, with the two elements forming a reflection type light detector to detect the presence of the decision mark 17.

FIG. 7a to d respectively show the signal waveforms at points a to d in the block diagram of FIG. 6. FIG. 7e shows the arrangement of recording pits on an optical disc having an erasable whitening recording material deposited thereon by evaporation similarly to the case of FIG. 3.

Figure 7:
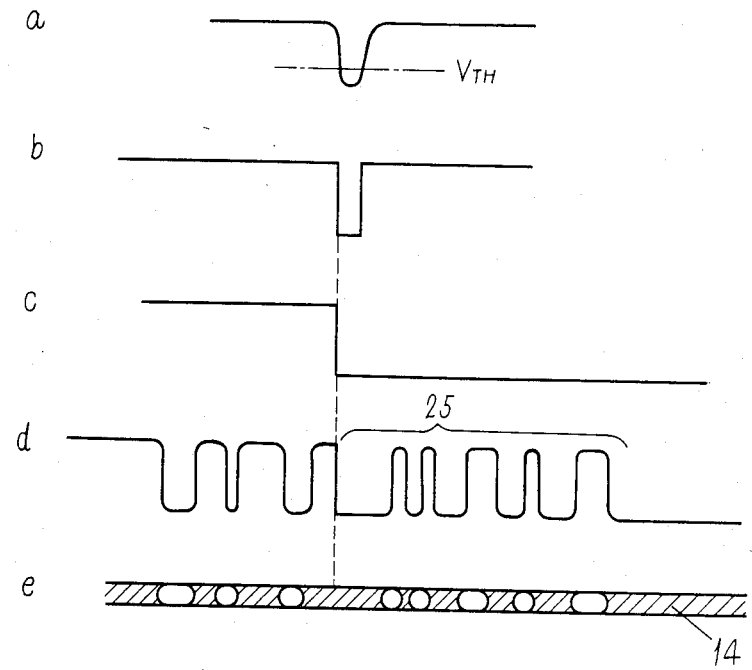
FIG. 7 consisting of a-e is a diagram showing the signal waveforms at various points of the appartus shown in FIG. 6.

In FIG. 6, numeral 20 designates a comparator which compares an output signal of the photodiode 19 with a reference voltage $V_{TH}$ and transforms the detected decision mark into a pulse (FIG. 7b). When this pulse is applied to a preset terminal of a flip-flop 21, a latched signal (FIG. 7c) is produced from its $\bar{Q}$ output. Numeral 22 designates an operational amplifier which generates an inverted waveform of the reproduced signal output from the preamplifier 9. Numerals 23a and 23b designate analog gate switches each of which is turned on when an L-level signal is applied to a gate terminal thereof. When the optical disc is mounted on the disc motor 7, a disc motor rotation command signal 24 is produced. The flip-flop 21 is cleared by a rising edge of the rotation command signal. However, the flip-flop 21 may be cleared in the other way. If there is a decision mark shown at 17 in FIG. 5 indicating that the optical disc is erasable, the photodiode 19 detects a waveform as shown in FIG. 7a. The comparator 20 compares this detection signal with the reference voltage $V_{TH}$ and generates a pulsed waveform (FIG. 7b). This output pulse latches the flip-flop output $\overline{Q}$ and the analog gate switch 23a is turned on. When the analog gate switch 23a is turned on, the preamplifier output is inverted and sent out through the operational amplifier 22. This state is shown at 25 in FIG. 7. In this way, even in the case of an erasable opticla disc of the whitening recording type, a positive voltage is produced by the pits having a recorded signal. Thus, stable reproduction may be effected by the same signal processing circuit 10 and digital demodulator 11 as in the case of an optical disc of the blackening recording type.

Figure 8:
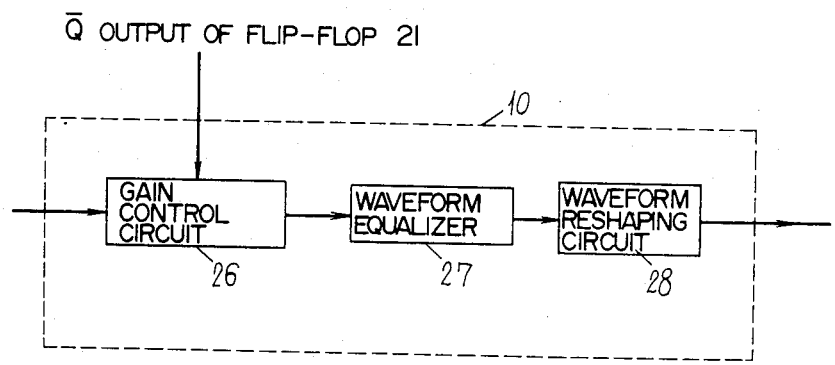
FIG. 8 is a block diagram showing the construction of the signal processing circuit in the embodiment shown in FIG. 6.

FIG. 8 shows the construction of the signal processing circuit 10 in the present embodiment. Numeral 26 designates a gain control circuit, 27 a waveform equalizer, and 28 a waveform reshaping circuit.

An erasable optical disc and an unerasable optical disc are different from each other not only in the polarity but also in the amplitude of the reproduced signal. Thus, in the embodiment of this invention, the decision signal of an erasable optical disc, namely, the $\overline{Q}$ output of the flip-flop 21 is utilized by the gain control circuit 26 to effect gain control of the amplitude of the reproduced signal. The frequency characteristics of the output subjected to amplitude correction through the gain control circuit 26 are corrected through the waveform equalizer 27, whose output is reshaped through the waveform reshaping circuit 28 and then applied to the digital demodulator 11.

With the construction described above, when optical discs of different recording materials are reproduced, a gain control is effected simultaneously with the inversion of the polarity of a reproduced signal, so that it becomes possible to obtain a reproduced signal of an optimum level.

Further, while, in this embodiment, the gain control is effected by the gain control circuit 26, the gain control may be effected in the preamplifier 9.

Also, while, in this embodiment, the decision mark is arranged in the inner circumferential portion of the information recording area, it may be arranged in the outer circumferential portion. Also, the decision mark may be disposed in the disk jacket containing the optical disc but not on the optical disc itself.

Figure 9:
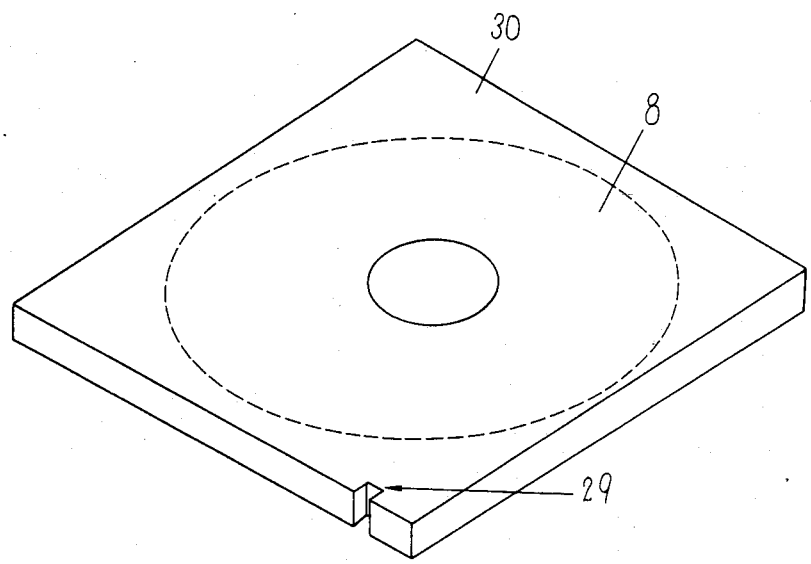
FIG. 9 is a perspective view showing a different embodiment of this invention in which a mark for determining a recording polarity of the optical disc is provided in a disc jacket.

FIG. 9 shows a different embodiment of this invention in which a decision mark 29 is formed in a disc jacket 30. Numeral 29 designates a decision mark disposed in a disc jacket 30. The decision mark 29 is provided by cutting away a portion of the disc jacket 30 and it is detected by a microswitch (not shown). In other words, when the microswitch is in an off state when the disc jacket is loaded, it is an indication that the optical disc is erasable. When a signal from the microswitch is applied to the preset terminal of the flip-flop 21, the output of the preamplifier 9 is inverted and it is applied to the signal processing circuit 10 in the like manner as mentioned above.

Figure 10:
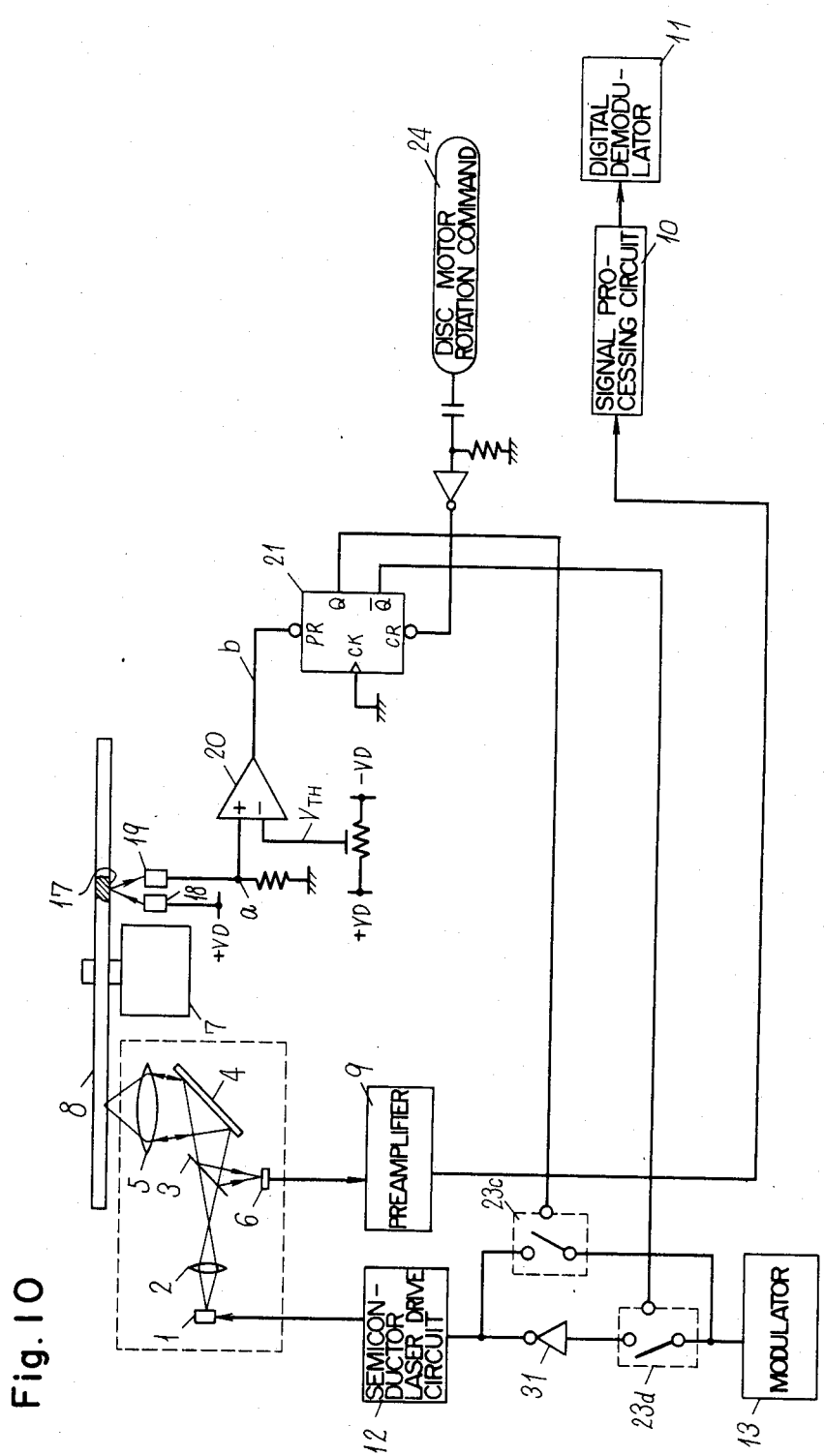
FIG. 10 is a block diagram showing the construction of an optical recording and reproducing apparatus of a second embodiment of this invention.

FIG. 10 is a block diagram showing the construction of an optical recording and reproducing apparatus of a further embodiment of this invention. The same numerals are used for the same component elements as in the embodiment shown in FIG. 6.

FIG. 10 is a block diagram showing the construction of a second embodiment of this invention. The same numerals are used for the same component parts as in FIG. 6. A modulated signal generated from the modulator 13 is applied to analog gate switches 23c and 23d. In the like manner as described in connection with FIG. 6, when it is determined that the optical disc is unerasable, the analog gate switches 23c and 23d are respectively turned on and off by the Q and $\overline{Q}$ outputs of the flip-flop 21, so that if the output of the modulator 13 is as shown at a in FIG. 11, it is applied to the semiconductor laser drive circuit 12 without changing its polarity. On the other hand, if it is determined that the optical disc is erasable, the analog gate switches 23c and 23d are respectively turned off and on, and the modulator output signal is applied to an inverter 31. As a result, the modulated signal is inverted as shown at a in FIG. 12, and this inverted modulated signal is applied to the semiconductor laser drive circuit 12.

Figure 11:
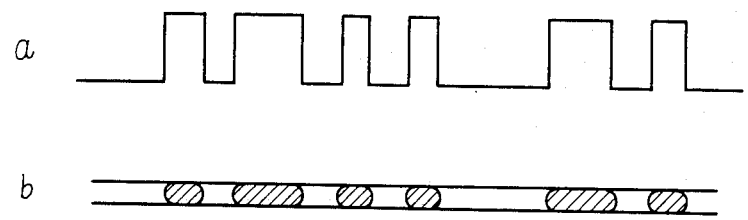
FIGS. 11 and 12, each consisting of a and b, are diagrams for explaining the operation of the embodiment of this invention shown in FIG. 10, with FIGS. 11 and 12 showing schematically the input waveform to the semiconductor laser drive circuit and the manner of recording in the guide track for an unreasable optical disc and an erasable optical disc, respectively.
Figure 12:
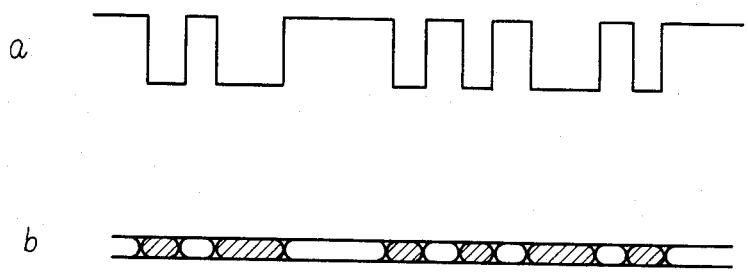

Thus, the patterns recorded on the optical discs have the same record pattern in both of the case of the unerasable optical disc and the case of the erasable optical disc as shown at b in FIG. 11 and at b in FIG. 12, respectively, and they can be reproduced by the same reproducing apparatus.

It should be noted that, in this embodiment, if the energy required for the recording differs as the recording materials of the optical discs differ, the amplitude of a signal to be recorded may be varied in accordance with the result of detection of a decision mark. In this case, a gain control circuit is connected before the semiconductor laser drive circuit 12, and a gain thereof is controlled in accordance with the result of detection of a decision mark.

INDUSTRIAL APPLICABILITY

As described hereinabove, the apparatus of the present invention is constructed so that a mark provided on an optical disc or a disc jacket to determine a recording polarity of the optical disc is detected, and the polarity of a signal to be recorded or reproduced is controlled in a positive or negative direction in accordance with the result of detection of the mark, and therefore the recording and reproduction of optical discs which provide reproduced signals of different polarities because of the characterisitics of their recording materials as in the case of erasable optical discs and unerasable optical discs can be effected stably by one and the same recording and reproducing apparatus.

What is claimed is:

1. An optical recording and reproducing apparatus comprising: a first light source for converging a tiny light beam spot and projecting it onto an optical disc for performing one of recording and reproducing a signal on said optical disc, mark detecting means for detecting a mark indicating a recording polarity of said optical disc which is provided in association with said optical disc, and control means for controlling a polarity of a signal to be recorded or reproduced in a positive or negative direction in accordance with said mark detected by said mark detecting means, said mark being provided on one of a disc jacket containing an erasable optical disc and a disc jacket containing an unerasable optical disc.

2. An optical recording and reproducing apparatus according to claim 1, wherein said mark has a phase structure formed of groove pits arranged in one of an area inward of the inner periphery and an area outward of the outer periphery of an information recording and reproducing area on said optical disc, and said mark is detected optically by using a second light source other than said first light source.

3. An optical recording and reproducing apparatus comprising: a first light source for converging a tiny light beam spot and projecting it onto an optical disc for performing one of recording and reproducing a signal on said optical disc, mark detecting means for detecting a mark indicating a recording polarity of said optical disc which is provided in association with said optical disc, control means for controlling a polarity of a signal to be recorded or reproduced in a positive or negative direction in accordance with said mark detected by said mark detecting means, and means for controlling an amplitude of said signal to be recorded or reproduced in accordance with said mark detected by said mark detecting means.

4. An optical recording and reproducing apparatus according to claim 3, wherein said mark has a phase structure formed of groove pits arranged in one of an area inward of the inner periphery and an area outward of the outer periphery of an information recording and reproducing area on said optical disc, and said mark is detected optically by using a second light source other than said first light source.

* * * * *